US012583981B2

(12) United States Patent　　　　　　　(10) Patent No.: US 12,583,981 B2
Intscher-Owrang et al.　　　　　　　　　(45) Date of Patent: Mar. 24, 2026

(54) SOFT GOODS FORMED FROM A FIBER LIQUID SLURRY HAVING SURFACE FEATURES, AND METHODS FOR MAKING THE SAME

(71) Applicant: Simplifyber, Inc., Raleigh, NC (US)

(72) Inventors: Maria Intscher-Owrang, Brooklyn, NY (US); Philip Cohen, Nashville, TN (US); Joseph Miller, Raleigh, NC (US); Juliana Marangon Jardim, Raleigh, NC (US)

(73) Assignee: Simplifyber, Inc., Raleigh, NC (US)

( * ) Notice: Subject to any disclaimer, the term of this patent is extended or adjusted under 35 U.S.C. 154(b) by 77 days.

(21) Appl. No.: 18/511,424

(22) Filed: Nov. 16, 2023

(65) Prior Publication Data

US 2024/0158586 A1　　May 16, 2024

Related U.S. Application Data

(60) Provisional application No. 63/425,766, filed on Nov. 16, 2022.

(51) Int. Cl.
　　*B29C 41/16*　　　(2006.01)
　　*B29C 41/42*　　　(2006.01)
　　*C08J 3/24*　　　　(2006.01)
　　*C08J 7/12*　　　　(2006.01)
　　*B29K 105/00*　　　(2006.01)
　　　　　　(Continued)

(52) U.S. Cl.
　　CPC .............. *C08J 3/245* (2013.01); *B29C 41/16* (2013.01); *B29C 41/42* (2013.01); *C08J 7/123* (2013.01); *B29K 2105/0032* (2013.01); *B29K 2105/12* (2013.01); *B29L 2031/505* (2013.01);

*C08J 2301/02* (2013.01); *C08J 2301/28* (2013.01); *C08J 2303/02* (2013.01); *C08J 2305/04* (2013.01); *C08J 2305/08* (2013.01); *C08J 2307/02* (2013.01); *C08J 2367/04* (2013.01); *C08J 2389/06* (2013.01)

(58) Field of Classification Search
None
See application file for complete search history.

(56) References Cited

U.S. PATENT DOCUMENTS

2004/0011489 A1　1/2004　Kimbara
2018/0340296 A1　11/2018　Chung
　　　　　(Continued)

FOREIGN PATENT DOCUMENTS

CN　　　2021 27 886 U　*　2/2012

OTHER PUBLICATIONS

International search report for PCT/US2023/080055 dated Feb. 2, 2024.

*Primary Examiner* — Mohammad M Ameen
(74) *Attorney, Agent, or Firm* — Getz Balich LLC

(57) ABSTRACT

The present invention discloses a molded article having a surface feature created by a light reactive agent interacting with light from a light source, and a method for making the same. The article is molded from a slurry comprised of an aqueous solution that includes a plurality of fibers and a light reactive agent. The slurry is molded into a three-dimensional solid fibrous molded part. The solid fibrous molded part is exposed to a light source such that the light reacts with the light reactive agent to create at least one surface feature. The surface feature can be, for example, a texture or a color change.

9 Claims, 4 Drawing Sheets

(51) Int. Cl.
   *B29K 105/12*      (2006.01)
   *B29L 31/50*      (2006.01)

(56)                References Cited

U.S. PATENT DOCUMENTS

2020/0063373 A1      2/2020   Parker
2022/0072806 A1*    3/2022   Intscher-Owrang  ...  D04H 1/425

* cited by examiner

SOFT GOODS FORMED FROM A FIBER LIQUID SLURRY HAVING SURFACE FEATURES, AND METHODS FOR MAKING THE SAME

PRIORITY CLAIM

This application claims the benefit of U.S. Provisional Patent Application Ser. No. 63/425,766 filed on Nov. 16, 2022, which is incorporated by reference herein in its entirety.

FIELD OF THE INVENTION

The field of the invention is apparatus and method for molding a two- or three-dimensional article and, more specifically, for molding a two- or three-dimensional article from an aqueous slurry that contains a plurality of fibers.

BACKGROUND OF THE INVENTION

The current process for creating soft goods, such as clothing, footwear (e.g., shoe uppers), bags, furniture, medical supplies, cleaning tools and consumables, toys, automotive interior parts, cases and housings for consumer electronics, and other soft goods is often wasteful and includes numerous steps. Within each manufacturing step is a separate, inefficient, labor-intensive process that often requires transport of materials between the steps. Scrap materials (e.g., cloth that is cut but not used) are often simply discarded, adding to the waste in the process. Additionally, it is often difficult to create patterns or prints/images appear on 3-dimensional item during production, it is difficult to make customized or post-order on-demand patterns or prints/images on products, and it is often difficult to make patterns or prints/images on textured items. These and other shortcomings in the prior art are addressed by the present invention, as disclosed herein.

SUMMARY OF THE INVENTION

According to one aspect of the present invention, a molded article having a surface feature created by reactive ingredients causing a reaction to create a surface feature (e.g., a light reactive agent interacting with light from a light source), and a method for making the same is disclosed. The method for producing the molded article includes providing a slurry comprised of an aqueous solution that contains at least an amount of water, a plurality of fibers and, a reactive ingredient (e.g., a light reactive agent), providing the slurry into a molding form that defines a three-dimensional void, draining at least some of the water from the slurry and applying at least one of heat and pressure to cause at least one of fiber to fiber bonding and chemical cross-linking between the plurality of fibers such that the slurry is transformed to the solid fibrous molded article, removing the solid fibrous molded article from the molding form; and, in the example of an embodiment using a light reactive agent, exposing the solid fibrous molded article to a light source such that the light from the lights source reacts with the light reactive agent to create at least one surface feature. In other embodiments a reactive ingredient may be exposed to another agent that a reaction. The surface features can be, for example, a texture or a color change.

According to another aspect of the present invention, the fibers can be selected from natural fibers, semi-synthetic fibers, and synthetic fibers.

According to a further aspect of the invention, the slurry can include biobased molecules or polymers.

According to an even further aspect of the present invention, a screen can be positioned between the light source and the solid fibrous molded part in order to block the light from contacting at least a portion of a surface of the solid fibrous molded part.

According to an even further aspect of the present invention, the screen can include a cutout to permit light to pass through a portion of the screen.

One advantage of the present invention includes the ability to make patterns or prints/images appear on 3-dimensional items during production.

Another advantage of the present invention includes the ability to make customized or post-order on-demand patterns or prints/images on products.

A further advantage of the present invention includes the ability to make patterns or prints/images on textured items.

These and other advantages will be apparent to one of skill in the art in light of the present disclosure and drawings.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

DETAILED DESCRIPTION OF THE INVENTION

Figure 1:
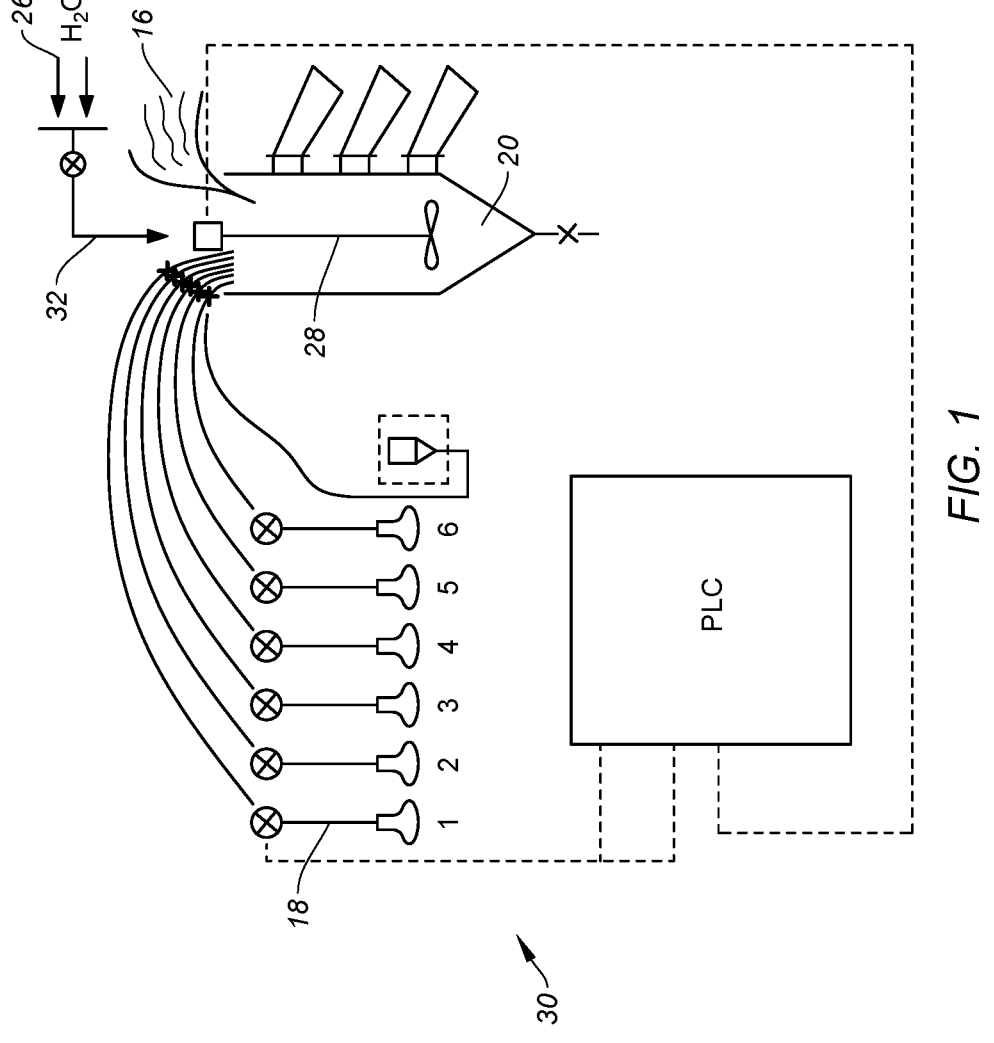
FIG. 1 shows a diagrammatic set up for adding at least some of the desired ingredients of the slurry into a mixer.

Referring now to FIGS. 1-4, the present invention is an article 10 that includes a surface feature 12, as well as apparatus and methods for making the article. The surface feature 12 can include, for example, a texture, pattern and/or dimensionality that is created by interacting ingredients and/or molding processes. Common articles formed using the methods and apparatus disclosed herein include, but are not limited to, footwear, clothing and various other apparel, bags and various other accessories, automotive interior upholstery and parts, consumer goods, furniture upholstery, and soft medical products. Examples of footwear include, but are not limited to, shoe uppers. Examples of clothing articles include, but are not limited to, shirts, shorts, gowns and other medical clothing, dresses, skirts, pants, socks, vests, sweaters, scarves, hats, gloves, mittens, and undergarments. Examples of bags include, but are not limited to, handbags, purses, backpacks, bookbags, satchels and clutches. Examples of automotive interior parts include, but are not limited to, interior panels, interior trim, seat covers, floor mats, dashboard covers and steering wheel covers. Examples of consumer goods include, but are not limited to, laptop/computer housings, soft circuit board coverings, phone cases, soft cleaning products and feminine hygiene products. Examples of furniture upholstery include, but are not limited to, chair and couch coverings, and wall coverings or panels. Examples of soft medical products include, but are not limited to, bandages and various other coverings, slings, and various other stabilization elements, to include soft goods for internal body use.

The present disclosure relates to the creation of a shoe upper in accordance with the present invention; however, one of skill in the art would understand that any of the above articles could be created using the teachings herein without departing from the spirit or scope of the present invention. The above listing of articles is intended to be exemplary and non-limiting.

The present invention includes a solid molded fibrous part 14 that is formed from an aqueous slurry that includes a plurality of fibers 16 and at least one reactive ingredient (e.g., a light reactive agent 18) (hereinafter referred to as "the slurry 20"). Either during or after the formation of the solid fibrous molded part 14, at least a portion of the solid fibrous molded part 14 is exposed to a light source 22 that reacts with the light reactive agent 18 in the solid fibrous molded part 14 causing a change in the characteristics of the surface (e.g, a surface feature 12).

The slurry 20 can include natural fibers, semi-synthetic fibers, synthetic fibers or a combination thereof. Natural fibers include wood fibers, plant fibers, and animal fibers. Wood fibers include, but are not limited to, hardwood and/or softwood fibers, bleached and/or unbleached, virgin and/or recycled. Plant-based fibers can include, but are not limited to, cotton, flax, hemp, jute, ramie, bamboo, sisal, abaca, kapok, coir, and general agricultural waste. Animal fibers can include, but are not limited to, wool, silk, cashmere, alpaca, llama, mohair, yak, camel hair, qiviut, vicuna, angora, and horsehair. The semi-synthetic fibers can include, but are not limited to, cellulose-based fibers such as rayon, viscose, modal, Tencel, Lyocell, and acetate. Synthetic fibers can include, but are not limited to, polyester, nylon, olefin, spandex/elastane, acrylic, PVC, aramid, microfiber. Additionally, sustainable synthetic fibers such as polylactic acid (PLA) fibers and polyhydroxyalkanoates (PHA) fibers can be used. One or more fiber types are added and any other ingredient, such as, but not limited to, biobased and/or synthetic molecules/polymers, and additives can be added to the material to be used, either before formation (while in a fluid state), after the material is dried or after the item (or part of the item) is formed. Biobased molecules/polymers can be added as binding agents and/or retention agents in order to enhance the wet and dry strength of the solid fibrous molded part 25. These biobased molecules/polymers include, but are not limited to, chitosan, starches, ionic starches, cellulosic materials such as, but not limited to, carboxymethylcellulose, nanofibrillated cellulose, nanocellulose, natural rubber latex, collagen, gelatine, alginate, polylactic acid, polyglycolic acid, and polyhydroxyalkanoates. Additionally, synthetic molecules/polymers and synthetic molecules/polymers with a certain amount of biobased carbon can be used in the materials, such as, but not limited to, polyurethane emulsions, thermoplastic materials, and resins, such as polyaminoamide-epichlorohydrin (PAE) in order to improve mechanical strength. One suitable slurry is disclosed in U.S. patent application Ser. No. 17/466,792, the disclosure of which is hereby incorporated by reference.

Additionally, as an example of an interacting ingredient, light reactive agents may be mixed into the slurry, or may be added during the final stages (e.g., drying) while the solid fibrous molded part is setting, or after the molding process is complete.

During these times, at least a portion of the solid fibrous molded part 14 is exposed to a light source 22 that reacts with the light reactive agent 18 in the solid fibrous molded part 14 causing a change in the characteristics of the surface (e.g, a surface feature 12). The change in the characteristics can occur at or around the location of interaction of the light from the light source 22 and the reactive agent at the surface 23 of the solid fibrous molded part 14. A washing step can be employed to halt the reaction between the light from the light source 22 and the light reactive agents in the solid fibrous molded part 14 once the desired effect has been achieved.

Examples of light reactive agents 18 include, but are not limited to, 'sun paints which can work using infrared light, heat, or drying mechanism; light-sensitive' dyes such as SolarFast dyes which are sensitive to and can produce patterns based on exposure to sunlight and/or ultraviolet light; and 'blue and silver printing' which utilize specific chemicals that once exposed to light or specific regions of the EM spectrum can develop a pattern.

The slurry 20 can be created by combining the fibers 16, water 26, an interacting ingredient such as a light reacting agent 18 and any other ingredients desired into a mixer 28. FIG. 1 shows an exemplary set up where a series of ingredient sources 30 are in communication with the mixer that enable an amount of various ingredients to be provided (e.g., pumped or gravity fed) into the mixer 28, as desired. In the example shown, up to six ingredient sources 30 are provided. In addition, a water source 32 and a source for fibers 16 are also provided for adding desired amounts of fiber 16 into the mixer 28. Once in the mixer 28, the ingredients are mixed, generally until all ingredients are fully mixed and/or dispersed, and the slurry takes on the form of a mixture, foam, or a homogeneous fiber dispersion. An example of the aforementioned slurry may contain, but is not limited to, the following content: water (20-99.99%), fibers (0.0075-60%), other additives (0.0025-20%).

Figure 2:
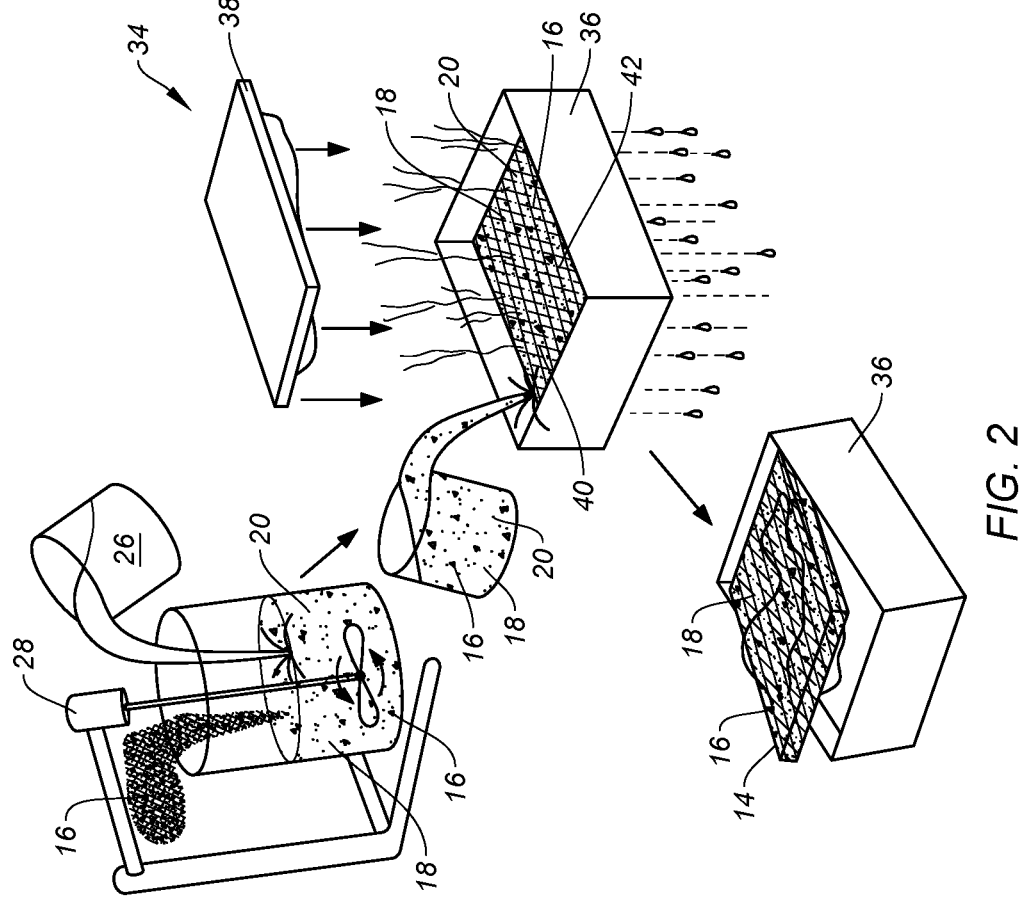
FIG. 2 shows a diagrammatic set up for mixing the slurry, providing an amount of the slurry into a molding form, and removing the solid fibrous molded part from the molding form.

Referring now to FIG. 2, once the desired ingredients are combined and mixed in the mixer 28, and the mixed slurry 20 can then be poured, pumped or gravity fed into a molding form 34. In the embodiment shown, the molding form 34 includes a first mold portion 36 and a second mold portion 38. The first mold portion 36 includes a screen 40 with openings 42 that generally allow water to drain therethrough but retains the solid fibers. The second mold portion 38 includes a desired two- or three-dimensional shape that is at least partially imparted onto the solid fibrous molded part 14. Optionally, the screen 40 in the first mold portion may also have a two- or three-dimensional shape that is at least partially imparted onto the solid fibrous molded part 14. As the water drains from the slurry 20 through the screen, heat and/or pressure may be applied to achieve fiber to fiber bonding, polymer to polymer bonding, and polymer to fiber bonding, as well as chemical cross-linking. In some embodiments, some or substantially all of the water is removed from the slurry 20. In other embodiments, it may be desirable to retain some or all of the water depending on the intended final design. The solid fibrous molded part can be removed from the mold form 34 and, optionally, further dried.

In an alternative embodiment, rather than adding the additional additives such as, but not limited to, thermoplastics, conducting and/or electronic element, dyes, light-reactive agents 18, and coatings during the mixing stage prior to forming, the additional additives can be added during the dehydration stage when water is draining from the mold form, during the drying stage after the solid fibrous molded part 14 is removed from the molding form 34 and/or during a secondary operation when the solid fibrous molded part 14 is pressed into the new shape after removal from the molding form 34. These interacting ingredients such as light reactive agents 18 can impart or allow a number of desirable surface features 12 on the surface 23 of the solid fibrous molded part 14 including, but not limited to, a change in color, a change in texture, change in emitted radiation, etc. In embodiments where light-reactive agents are added, it is preferable that the environment is a dark, near-dark, or radiation-controlled space.

Figure 3:
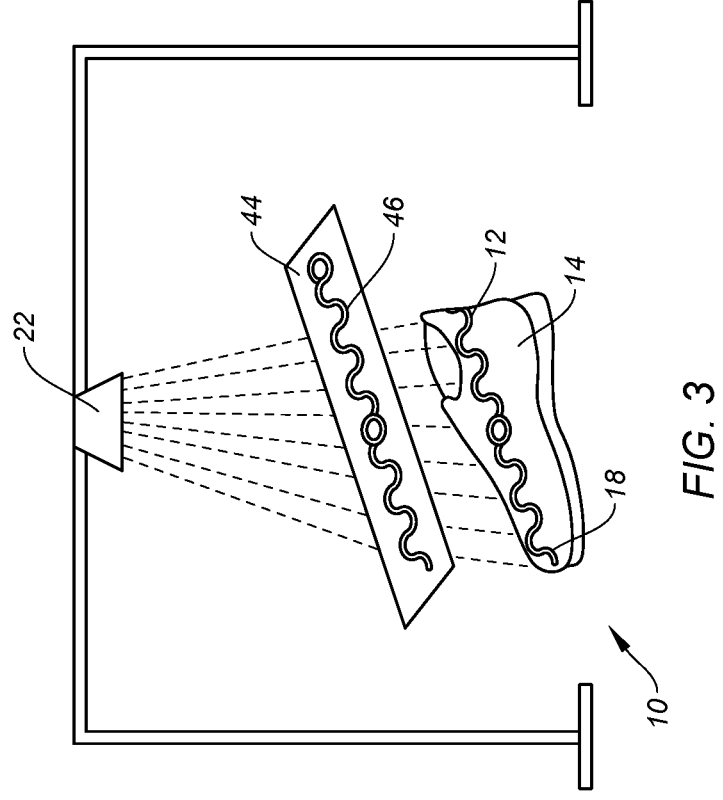
FIG. 3 shows a first embodiment of imparting an image onto an article utilizing a light source.
Figure 4:
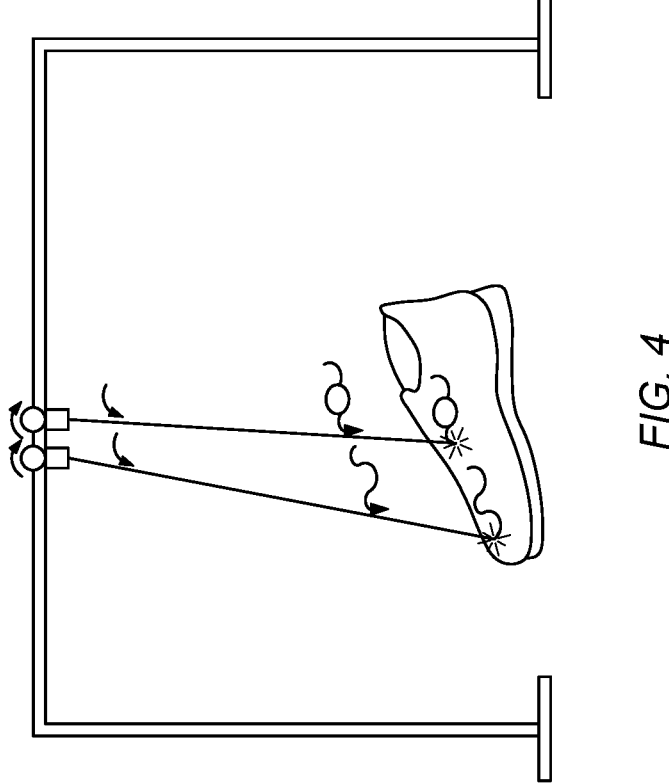
FIG. 4 shows a second embodiment of imparting an image onto an article utilizing a light source.

Referring now to FIGS. 3 and 4, light from a light source 22 such as sunlight or an ultraviolet light may be applied to the solid fibrous molded part 14. In some embodiments (not shown), the light may be provided onto all or substantially all of the solid fibrous molded part 14 so that the substantially the entire surface 23 that contains a light reactive agent 18 exposed to the light achieves at least some reaction. In some embodiments, as shown in FIG. 3, a screen 44 that blocks light from reaching the solid fibrous molded part 14 may be positioned between the light source 22 and the solid fibrous molded part 14. The screen 44 can optionally include a cutout 46 in the shape of a desired pattern such that the light passing through the cutout 46 contacts a portion of the solid fibrous molded part 14 that generally corresponds to the shape of the cutout 46. Alternatively, as shown in FIG. 4, a screen 44 in the shape of the desired image can be placed in between the light source 22 and the solid fibrous molded part 14 such that light contacts the solid fibrous molded part 14 in substantially all areas except where the screen 44 blocks the light. The period of time that the light is applied to the solid fibrous molded part 14 depends on a number of factors including, but not limited to, intensity of the light, the type of light reactive agent 18 utilized, the concentration of the light reactive agent 18 in the solid fibrous molded part 14, and the desired intensity of the final surface features 12. As shown in FIG. 3, the light source may be stationary and, e.g., mounted on a frame. In other embodiments, as shown in FIG. 4, the light may be movable such that it, e.g., passes across the solid fibrous molded part 14 during operation.

Once the light reactive agent 18 has been exposed to the desired type of light for the desired amount of time and the desired reaction has been achieved, the material can be subjected to a washing step with water and detergent in order to halt additional reactions and/or remove the undeveloped light reactive ingredient when the solid fibrous molded part 14 came into contact with, e.g., ambient light.

After the undeveloped light reactive agent(s) 18 have been washed out it may be advantageous to apply subsequent coatings to the final solid fibrous molded part 25. The subsequent coatings may include but are not limited to waxes, latexes, silicones, acrylics, rubbers, and fluoropolymers, polyurethanes. —In addition, secondary operations may be undertaken before or after the light reactive agent 18 is exposed to light. For example, the solid fibrous molded part 14 may be attached to another article (e.g., in the example of a shoe upper, the shoe upper may be attached to a sole).

In operation, the components to the slurry 20, including at least water 26, a single type of fiber or a plurality of fiber types 16, additives, and, optionally, an interacting ingredient such as a thermoplastic, conducting and/or electronic element, and/or a light reactive agent 1 18 are provided to a mixer 28. In some embodiments, the interacting ingredient 18 may be added after the slurry 20 is added to the molding form 34. The components are mixed until the slurry 20 is a mixture, foam, or a homogeneous suspension. The slurry 20 is then added to the molding form 34 where none, some, most, or all of the water (depending on final product material) from the slurry 20 is drained, effectively dehydrating the substance during the process of converting the slurry 20 to a solid fibrous molded part 14. During the molding process, heat and/or pressure can be applied to the mold form to further eliminate water from the slurry 20 and achieve, e.g., fiber to fiber bonding, polymer to polymer bonding, and polymer to fiber bonding, as well as chemical cross-linking.

After removal from the molding form 34, the solid fibrous molded part 14 is, in some instances, permitted to continue to dry and/or subjected to an additional forming operation. In the case where the interacting ingredient is a light reactive agent, it is preferable that the molding process takes place in the dark, or in a type of light to which the reactive agent does not react.

Light from a light source 22 is applied to the solid fibrous molded part 14 such that the light reactive agent 18 reacts with the light and results in a surface feature 12, such as a change in color or texture. A screen 44 may be placed in between the solid fibrous molded part 14 and the light source 22 in order to enable the designer to impart a desired surface feature (or lack thereof) onto the surface 23 of the solid fibrous molded part 14.

Once the desired surface feature 12 has been achieved, a washing step may be applied to the solid fibrous molded part 14 to substantially halt further reactions to the surface 23 and/or to remove the undeveloped light reactive components of the solid fibrous molded part 14.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for producing a solid fibrous molded article, comprising:

providing a slurry that contains at least an amount of water, a plurality of fibers and an interacting ingredient, the interacting ingredient includes a light reacting agent;

providing the slurry into a molding form that defines a three-dimensional void;

draining at least some of the water from the slurry and applying at least one of heat and pressure to cause at least one of fiber to fiber bonding and chemical cross-linking between the plurality of fibers such that the slurry is transformed to the solid fibrous molded article;

removing the solid fibrous molded article from the molding form; and exposing the solid fibrous molded article to a light source such that light from the lights source reacts with the light reactive agent to create at least one surface feature;

wherein the at least one surface feature includes at least one of a pattern, texture and color change.

2. The method of claim 1 wherein the slurry is in the form of a mixture, foam or homogeneous suspension after mixing.

3. The method of claim 1 wherein the slurry includes at least one type of fiber selected from natural fibers, semi-synthetic fibers, and synthetic fibers.

4. The method of claim 3, wherein the slurry includes at least two types of fibers selected from natural fibers, synthetic fibers, semi-synthetic fibers, and synthetic fibers.

5. The method of claim 1, wherein the slurry includes biobased molecules or polymers.

6. The method of claim 5, wherein the biobased molecules or polymers is one of chitosan, starches, ionic starches, and cellulosic materials.

7. The method of claim 1 wherein a screen is positioned between the light source and the solid fibrous molded article in order to block the light from contacting at least a portion of a surface of the solid fibrous molded article.

8. The method of claim 7 wherein the screen includes a cutout that permits light to pass through the screen and contact at least a portion of the surface of the solid fibrous molded article.

9. The method of claim 1 wherein a washing step is applied to the solid fibrous molded article in order to substantially halt continued reactions between the light reactive agent and light.

* * * * *